United States Patent
Cheyne et al.

(10) Patent No.: US 11,332,137 B2
(45) Date of Patent: May 17, 2022

(54) VEHICLE SENSOR SYSTEMS, COMPONENTS AND METHODS

(71) Applicant: HYSTER-YALE GROUP, INC., Fairview, OR (US)

(72) Inventors: Mark Cheyne, Portland, OR (US); Christopher Shultz, Portland, OR (US)

(73) Assignee: HYSTER-YALE GROUP, INC., Fairview, OR (US)

( * ) Notice: Subject to any disclaimer, the term of this patent is extended or adjusted under 35 U.S.C. 154(b) by 193 days.

(21) Appl. No.: 16/500,077

(22) PCT Filed: Apr. 3, 2018

(86) PCT No.: PCT/US2018/025903
§ 371 (c)(1),
(2) Date: Oct. 1, 2019

(87) PCT Pub. No.: WO2018/187341
PCT Pub. Date: Oct. 11, 2018

(65) Prior Publication Data
US 2021/0101595 A1   Apr. 8, 2021

Related U.S. Application Data

(60) Provisional application No. 62/481,070, filed on Apr. 3, 2017.

(51) Int. Cl.
*B60W 30/14* (2006.01)
*B60W 30/09* (2012.01)
(Continued)

(52) U.S. Cl.
CPC .......... *B60W 30/146* (2013.01); *B60W 30/09* (2013.01); *B60W 30/0956* (2013.01);
(Continued)

(58) Field of Classification Search
CPC ............. B60W 30/146; B60W 30/182; B60W 30/18181; B60W 30/09; B60W 30/0956;
(Continued)

(56) References Cited

U.S. PATENT DOCUMENTS

2005/0033540 A1    2/2005   Bathurst
2008/0288615 A1   11/2008   Singh
(Continued)

FOREIGN PATENT DOCUMENTS

| CN | 104066629 | 9/2014 |
|----|-----------|--------|
| CN | 104094340 | 10/2014 |
| EP | 3144207 A1 | 3/2017 |

OTHER PUBLICATIONS

International Search Report and Written Opinion for PCT/US2018/025903; dated Aug. 7, 2018; 18 pages.
(Continued)

*Primary Examiner* — Jason Holloway
(74) *Attorney, Agent, or Firm* — Schwabe Williamson & Wyatt

(57) ABSTRACT

A vehicle includes a vehicle controller communicating over a first communication system with actuators for changing the state of vehicle systems. A signal module communicates with the vehicle controller via the first communication system. One or more signal sources communicate with the signal module via a second communication system, and transmit signals to the signal module. Based on one or more signals and one or more user inputs, the signal module generates and transmits control signals to the vehicle controller. The vehicle controller actuates the actuator based on the control signal.

15 Claims, 11 Drawing Sheets

(51) Int. Cl.
   *B60W 30/095* (2012.01)
   *G05D 1/02* (2020.01)
   *B60W 30/182* (2020.01)
   *B60W 30/18* (2012.01)
   *B66F 9/075* (2006.01)
   *B66F 17/00* (2006.01)

(52) U.S. Cl.
   CPC .... *B60W 30/182* (2013.01); *B60W 30/18181* (2013.01); *G05D 1/0214* (2013.01); *G05D 1/0223* (2013.01); *B60W 2300/121* (2013.01); *B60W 2554/802* (2020.02); *B66F 9/0755* (2013.01); *B66F 9/07568* (2013.01); *B66F 17/003* (2013.01)

(58) Field of Classification Search
   CPC ...... B60W 2554/802; B60W 2300/121; G05D 1/0214; G05D 1/0223; B66F 9/0755; B66F 9/07568; B66F 17/003
   See application file for complete search history.

(56) References Cited

U.S. PATENT DOCUMENTS

| | | |
|---|---|---|
| 2008/0306647 A1 | 12/2008 | Jeon |
| 2009/0099897 A1* | 4/2009 | Ehrman ................. G06Q 10/06 705/7.15 |
| 2010/0039247 A1* | 2/2010 | Ziegler .................... G07C 5/08 340/436 |
| 2012/0283894 A1* | 11/2012 | Naboulsi ................. A61B 5/18 701/1 |
| 2015/0266409 A1 | 9/2015 | Akiyama |
| 2017/0080949 A1 | 3/2017 | Sinaguinan |
| 2017/0084179 A1 | 3/2017 | Chen |
| 2018/0143731 A1* | 5/2018 | Ochenas ............... B66F 9/0759 |

OTHER PUBLICATIONS

International Preliminary report on Patentability for PCT/US2018/025903; dated Oct. 21, 2019; 10 pages.

* cited by examiner

VEHICLE SENSOR SYSTEMS, COMPONENTS AND METHODS

CROSS-REFERENCE TO RELATED APPLICATION

This patent application is a U.S. National Phase Application under 35 U.S.C. § 371 of International Application No. PCT/US18/25903, filed 3 Apr. 2018, entitled "VEHICLE SENSOR SYSTEMS, COMPONENTS AND METHODS," which claims the benefit of U.S. Provisional Application No. 62/481,070, filed on 3 Apr. 2017, entitled "VEHICLE SENSOR SYSTEMS, COMPONENTS AND METHODS," the entire contents of which are hereby incorporated by reference herein.

TECHNICAL FIELD

Vehicles with signal generators and, singularly or in any combination, configuring such vehicles for removing signal generators, adding signal generators, and modifying a vehicle function based on at least one of a user option and an added or removed signal generator.

SUMMARY

Vehicles are increasingly being equipped with signal generators, such as sensors, switches, buttons, detectors (such as proximity detectors), and other suitable signal sources. Vehicle operating conditions, parameters, or both are changed based on signals generated by such signal generators. The present inventors have recognized a need to provide flexibility for adding or removing signal generators to or from a vehicle, and for modifying how vehicle functions, such as operating conditions, parameters, or both, are performed according to user option without modifying the base software for a vehicle controller when a signal generator is added or removed, or a user option is changed.

DETAILED DESCRIPTION

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the terms "module" and/or "logic" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

A vehicle control system may include a vehicle system manager ("VSM") 5, also known as a vehicle controller, a signal module, or both. A vehicle control system may, in certain embodiments, may include one or more communication systems. In certain embodiments, a vehicle control system encompasses actuators and signal generators. In other embodiments, it does not.

Figure 1:
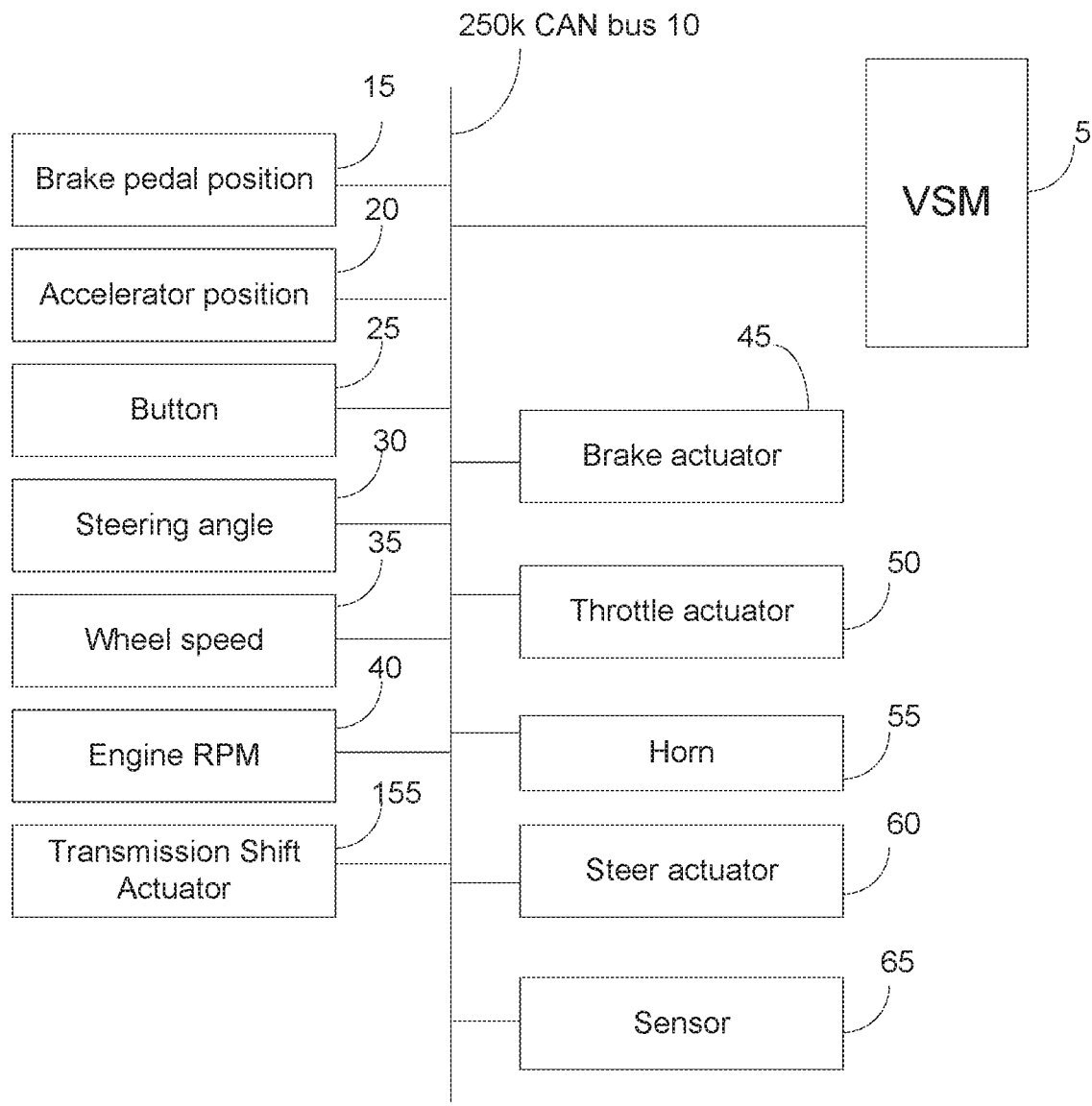
FIG. 1 is a schematic illustration of a prior art signal generator communicating with a vehicle controller.

With reference to FIG. 1, a vehicle system manager ("VSM") 5, also known as a vehicle controller, is the electronic brain of a vehicle that interacts with signal sources and effects changes to vehicle functions based on signals received from the various signal sources. Typically, the VSM 5 communicates with various signal sources via a communication system, such as CAN bus 10, using a communication protocol, such as the standard CAN protocol. Exemplary signal sources or generators include a brake pedal position sensor 15, an accelerator position sensor 20, a button 25 for actuating a horn, a steering angle sensor 30, a wheel speed sensor 35, and an engine RPM sensor 40. Other suitable signal sources, such as sensor 65 may be in communication with CAN bus 10 to communicate with the VSM 5. The VSM 5 also communicates with various system actuators, such as electronically operated actuators, via the CAN bus 10. Exemplary actuators, and electronically operated actuators, include a brake actuator 45, a throttle actuator 50, a horn actuator 55, a steer actuator 60 or a transmission shift actuator 155. Other suitable actuators may be in communication with CAN bus 10.

Figure 2:
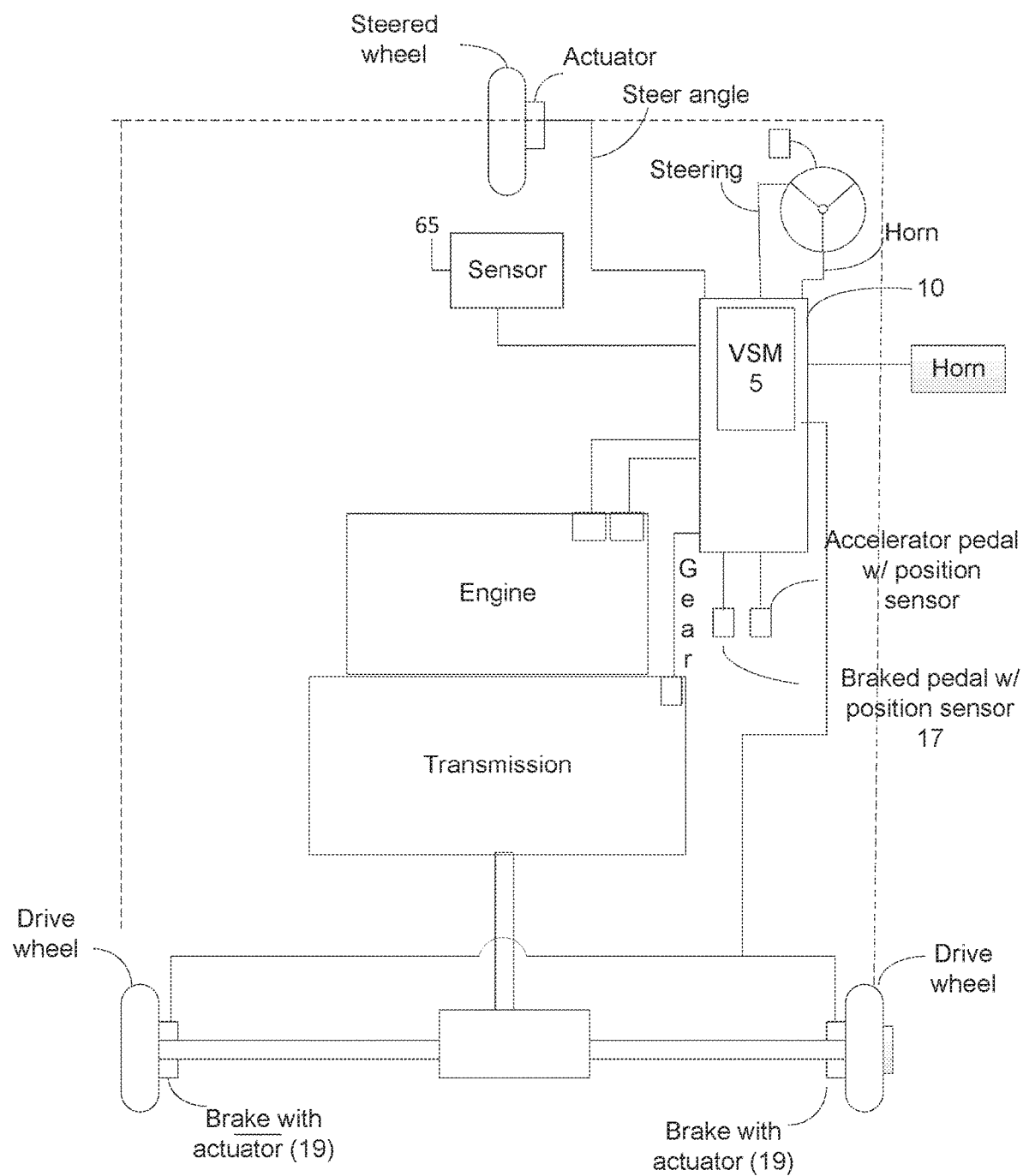
FIG. 2 is a schematic illustration of a prior art vehicle containing a signal generator communicating with a vehicle controller.

In operation, the VSM 5 receives a signal from a signal source and, for example via base software contained in the VSM 5, the VSM 5 effects a change to a vehicle function by changing one or more operating conditions, parameters, or both. Changing an operating condition means effecting a physical change to a vehicle, such as slowing it, accelerating it, turning it, and etc. Changing a parameter means effecting a change of an operational limit of a vehicle, such as a maximum allowed acceleration, a maximum allowed deceleration, a maximum turning radius, a maximum speed, a minimum speed, and etc. For example, the brake pedal position sensor 15 generates a signal in response to an operator pressing on a brake pedal 17 (see FIG. 2) where such signal is indicative of the brake pedal position. In response to receiving the signal indicative of the brake pedal position from the brake pedal position sensor 15, the VSM 5 changes a vehicle function. For example, the VSM 5 changes the operating condition of the vehicle by causing the brakes 19 (see FIG. 2) to be actuated via the brake actuator 45 where the amount of brake actuation corresponds to the brake pedal position.

The present inventors have recognized that current common practice is to connect additional signal generators to the CAN bus 10 to provide communication between such signal generators and the VSM 5 and/or disconnect an existing signal source from the VSM 5. When a new or additional signal generator is connected to the CAN bus 10, current common practice is also to reprogram the base software of the VSM 5 to be responsive to such signal generators, which for various reasons is undesirable.

As a hypothetic example, current practice is to connect a distance sensor 65 (employing an ultrasonic, light, or other suitable distance measuring device) to the CAN bus 10 to establish communication between the distance sensor 65 and the VSM 5. In turn, the base software in the VSM 5 is reprogrammed to recognize distance signals generated by the distance sensor 65 and to generate signals in response to such distance signals. For example, the base software of the VSM 5 may be reprogrammed to send signals to a brake actuator 45 to stop a vehicle in response to receiving a distance signal from the distance sensor 65 indicating that the vehicle is 1 meter from an object. Or, if an operator desires a different user option, the base software of the VSM 5 may be reprogrammed to slow the vehicle to 0.5 km/h, but not stop it, in response to receiving the distance signal from the distance sensor 65 indicating that the vehicle is 1 meter from the object. User options refer to behavior characteristics, limits, or both that are applied to vehicle functions and are typically numerically expressed.

The present inventors have also recognized that it is not desirable to reprogram the base software of the VSM 5 when an existing signal source is disconnected from the VSM 5, a new signal source communicates with the VSM 5, or when an operator desires the VSM 5 to effect a different change to a vehicle function in response to the same signal from an existing signal source, but based on a different user option.

Such reprogramming is undesirable because the VSM 5 is the electronic brain of the vehicle, and even if the reprogramming for a signal source is correctly performed, such reprogramming may affect other existing programming in the base software of the VSM 5 in an unforeseen manner. In other words, unintended errors may be introduced to the VSM 5 that may adversely affect operation of the vehicle.

The present inventors further recognized that reprogramming the base software of the VSM 5 typically requires time and resource-consuming revalidation of all of the programming contained in the VSM 5, which may require several months to complete.

Example Architecture

Accordingly, the present inventors recognized that combining a current VSM, such as VSM 5, or a VSM, such as VSM 5A (see FIGS. 3A-3C), that contains additional programming with respect to vehicle functions in the base software and preferably undergoes testing and validation before being incorporated into a vehicle, with a signal module 70 provides flexibility to add and remove signal sources and to change user options for vehicle functions in response to signals from signal sources without reprogramming the base software of the VSM.

Depending on the vehicle functions desired for a vehicle, an existing VSM, such as VSM 5, or a new VSM with updated base software, such as VSM 5A, may be used with a signal module 70. Optionally, once the base software in a VSM has been tested and the VSM is installed on a vehicle no changes to the VSM base software are required to add a signal source, remove a signal source, or change one or more user options for a vehicle. Such changes to signal sources, user options, or both, alter how the VSM modifies vehicle functions without reprogramming the base software of the VSM as described below.

With reference to FIGS. 3A, 3B, 3C, and 4, as a hypothetic example, the user may desire a forklift truck to have the following functions. Limit the speed in a forward direction when an object is detected to be at a user-defined distance in front of the truck or closer. Limit the speed in a reverse direction when an object is detected to be at a user-defined distance behind the truck or closer. If the truck is brought to a stop, hold the truck at a stop state for user-defined conditions. If the truck is held at a stop state, allow the operator to override the stop state for user-defined conditions. Depending on the operating environment, vehicle type, user preferences, and other suitable factors other vehicle functions may be provided.

Figure 3A:
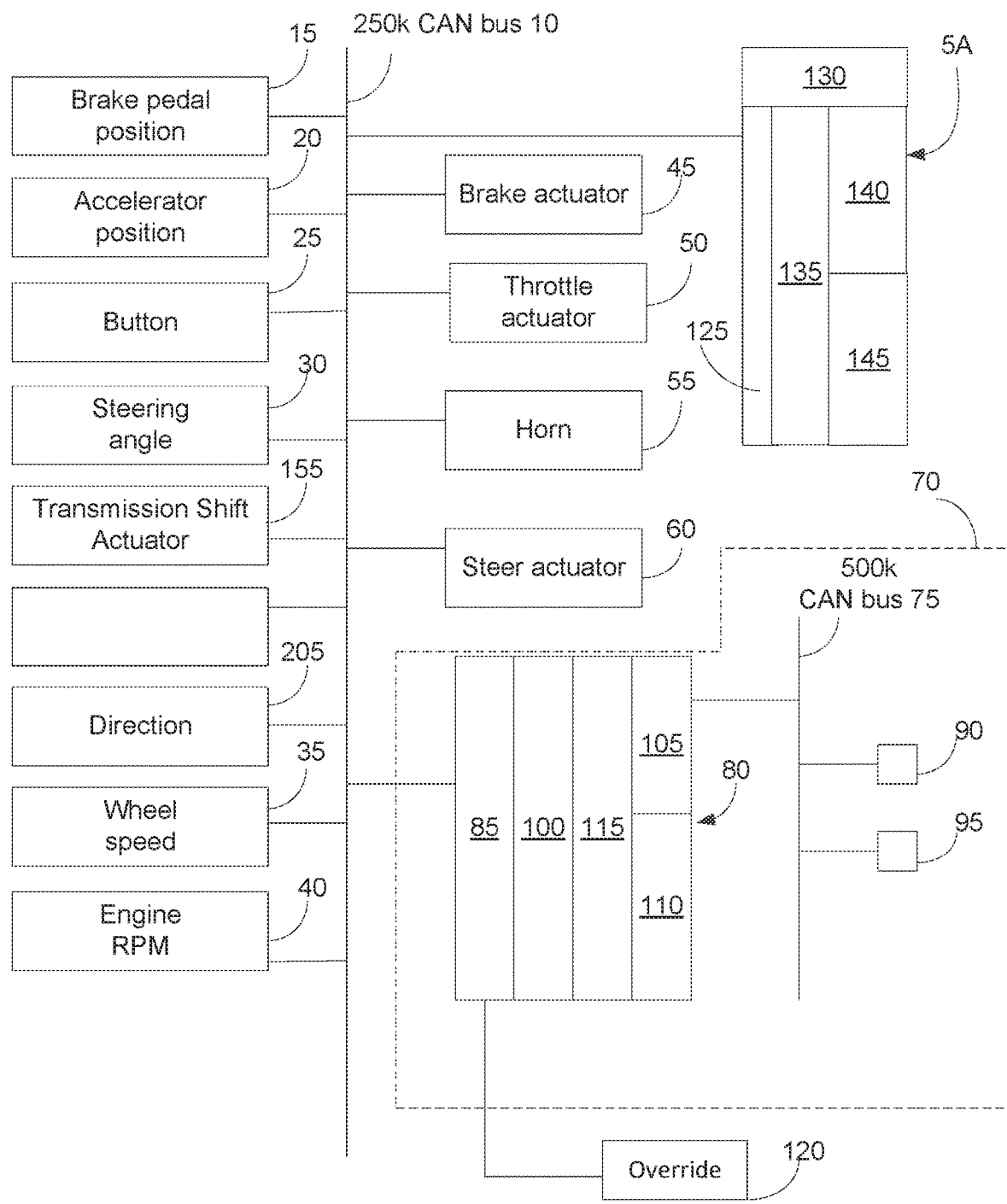
FIG. 3A is a schematic illustration of an exemplary signal generator communicating with an exemplary signal module, in accordance with embodiments herein.

The schematically illustrated system in FIG. 3A may be used to provide the above described functions for a forklift truck, or other suitable vehicle. Signal module 70 communicates with the VSM 5A via a first communication system, such as the CAN bus 10. Signal module 70 comprises a second communication system, such as the second CAN bus 75. While CAN buses are disclosed as preferred communication systems, any suitable communication system may be used. The signal module 70 illustrated in FIG. 3A also comprises a controller 80 that comprises hardware 85 that includes (i) a signal receiving portion for receiving signals from signal sources over CAN bus 75, over CAN bus 10, or both, and (ii) a signal transmitting portion for transmitting signals to VSM 5A over CAN bus 10, an optional configuration file 100, that may reside on processor 105 or memory 110, and base software 115 that may reside on processor 105, memory 110, or both.

Optionally, signal sources are added to or disconnected from CAN bus 75 to communicate, or stop communicating, with the controller 80, respectively. Optionally, signal sources may be connected to controller 80, for example, via hardware 85, and may transmit analog signals, digital signals, or both, to controller 80. Compared against having only a single communication system, such as CAN bus 10, one advantage of including a second communication system, such as CAN bus 75, is that the CAN bus 75 may have a different operational speed than the CAN bus 10. For example, CAN bus 10 operates at 250 k baud rate whereas CAN bus 75 operates at 500 k baud rate. Providing a CAN bus 75 with, optionally, a higher-speed capacity or a lower speed capacity, allows signal sources with operating speeds that are faster, or slower, than CAN bus 10 can handle to be incorporated as part of the vehicle. Inclusion of a second communication system may be beneficial when updating an existing vehicle, or existing vehicle design, to include new signal sources without updating the entire electronic architecture of the vehicle.

Figure 3B:
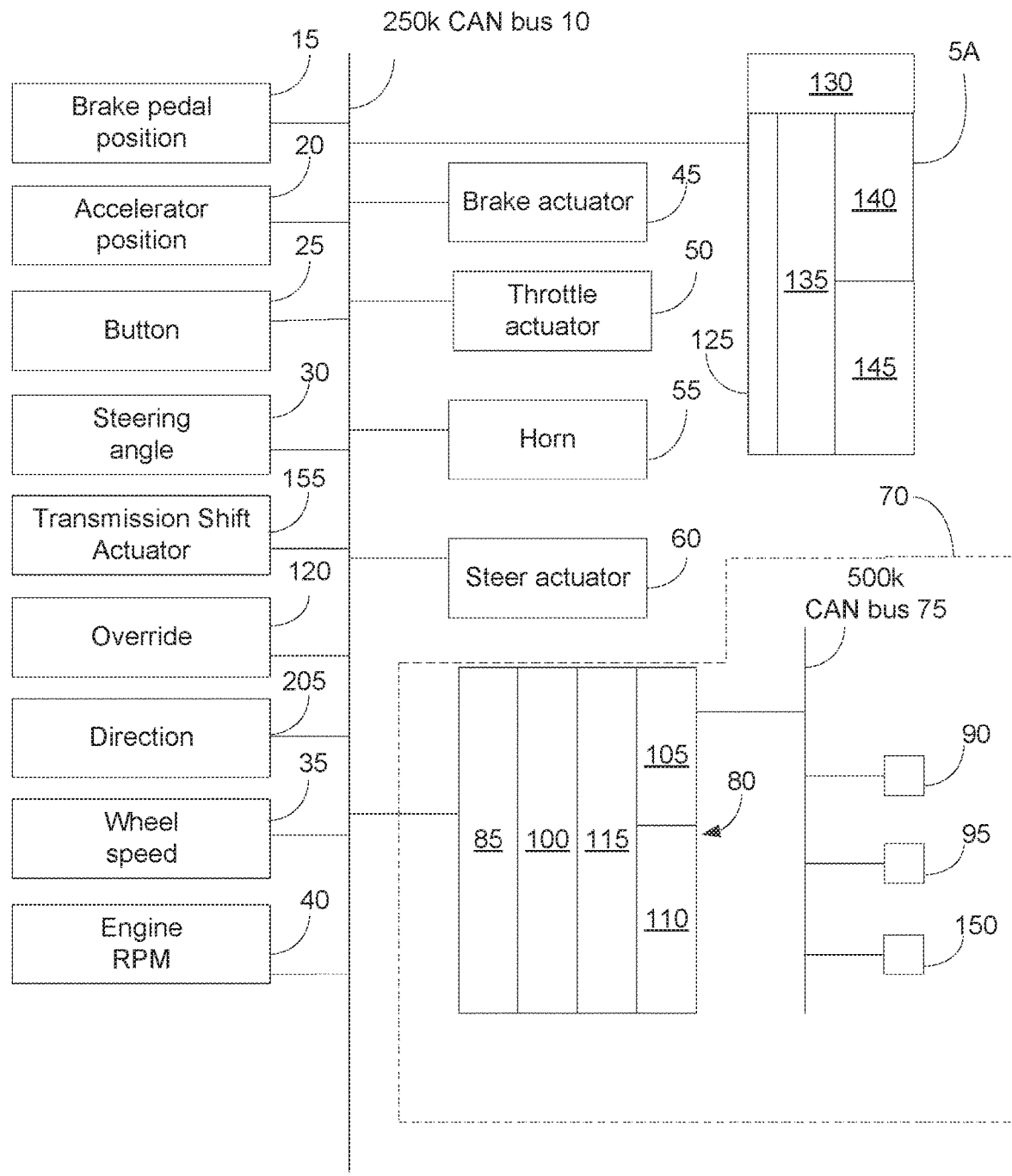
FIG. 3B is a schematic illustration of an exemplary signal generator communicating with an exemplary signal module, in accordance with embodiments herein.
Figure 3C:
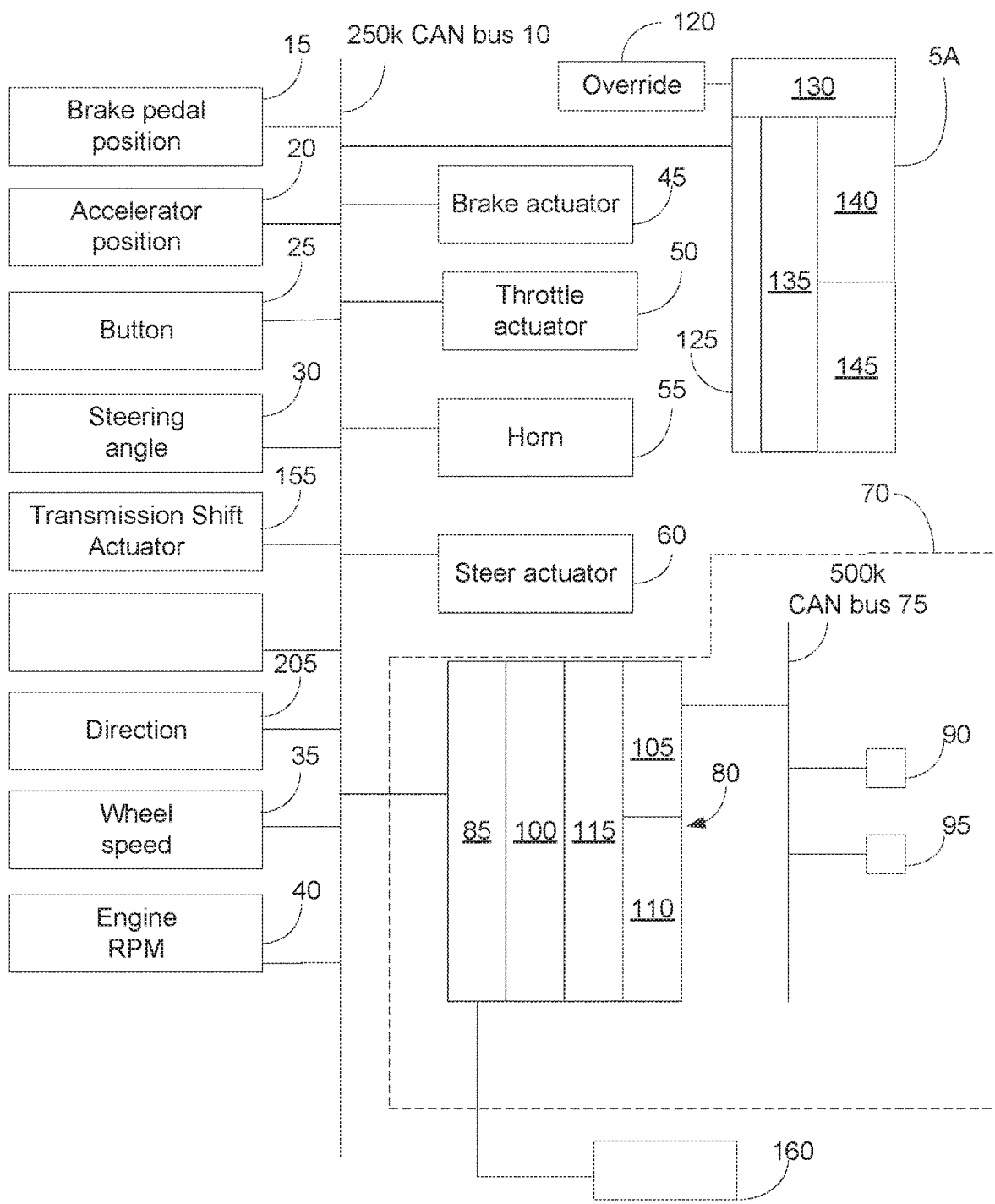
FIG. 3C is a schematic illustration of an exemplary signal generator communicating with an exemplary signal module, in accordance with embodiments herein.
Figure 4:
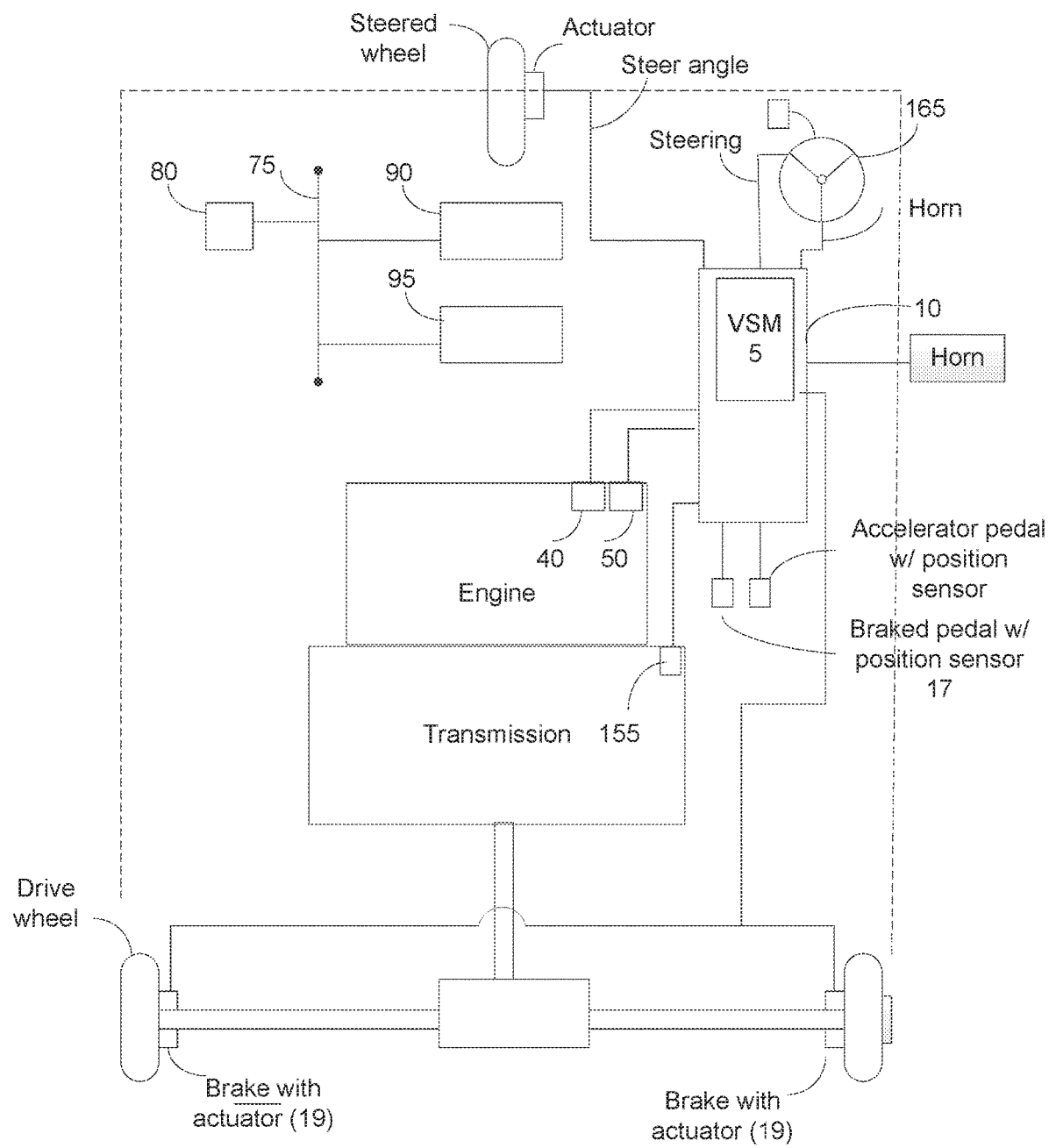
FIG. 4 is a schematic illustration of a vehicle containing a signal generator of FIG. 3A.
Figure 5:
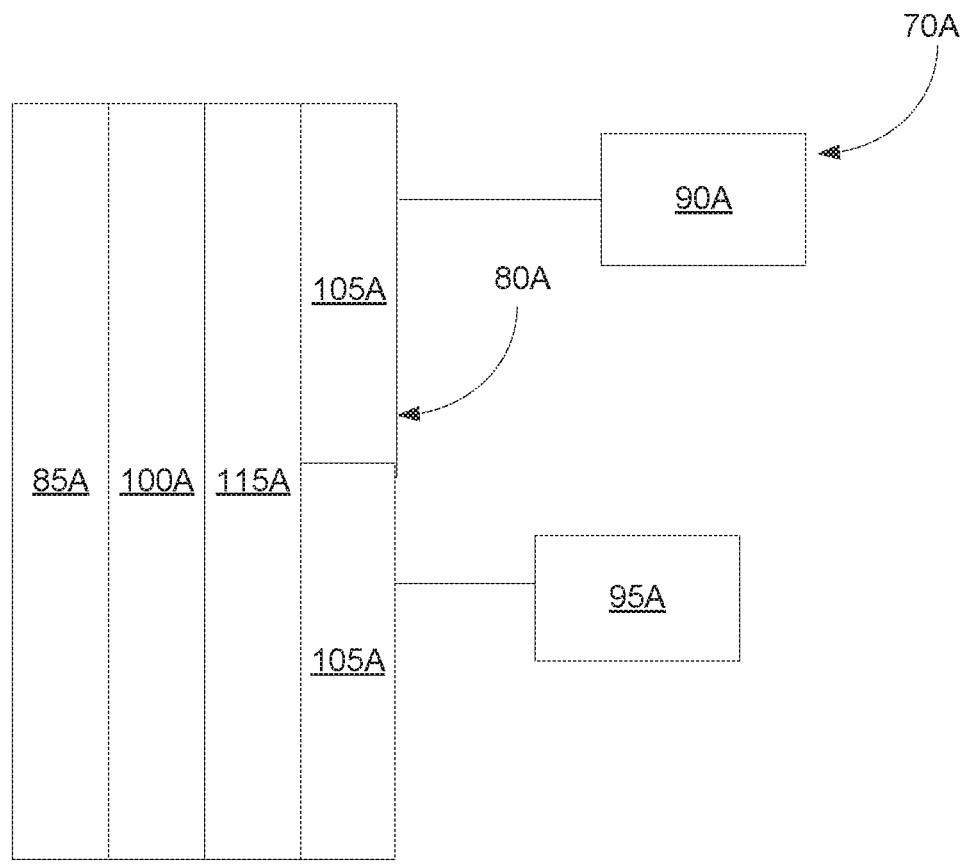
FIG. 5 is a schematic illustration of another exemplary signal generator, in accordance with embodiments herein.

Signal source 90 may comprise a forward distance sensor that serves as an object detector by detecting whether an object is within a user-defined distance of the front of the vehicle. Signal source 90 communicates with the controller 80 via the CAN bus 75, and transmits a distance signal over the CAN bus 75 to the controller 80. Signal source 95 may comprise a rearward distance sensor that serves as an object detector by detecting whether an object is within a user-defined distance of the back of the vehicle. Signal source 95 communicates with the controller 80 via the CAN bus 75, and transmits a distance signal over the CAN bus 75 to the controller 80. Optionally, signal source 120 may comprise an override button that transmits an override signal directly to the controller 80 via the hardware 85. Optionally, signal source 120 may communicate with the controller 80 via the CAN bus 10 (FIG. 3A), or may communicate with the controller 80 via the CAN bus 75, or may directly communicate with the VSM 5A via the hardware 125 (FIG. 3B).

For the hypothetic example, the values for the user options for the user-determined conditions and results reside in the optional configuration file 100 which serves as a user option storage. The base software 115 of the controller 80 includes programming for determining whether an object is within a user-defined distance in front of or behind a vehicle, whether a speed limit should be applied, whether the vehicle will be held at a stop state if stopped, and if an override is allowed in the event the vehicle is held at a stop state. Such programming includes variable placeholders where the values for such variable placeholders are contained in the configuration file 100. If the configuration file 100 is omitted, the base software 115 may serve as the user option storage by containing the values for the user options for the user-defined conditions.

Vehicle Functions

Figure 6:
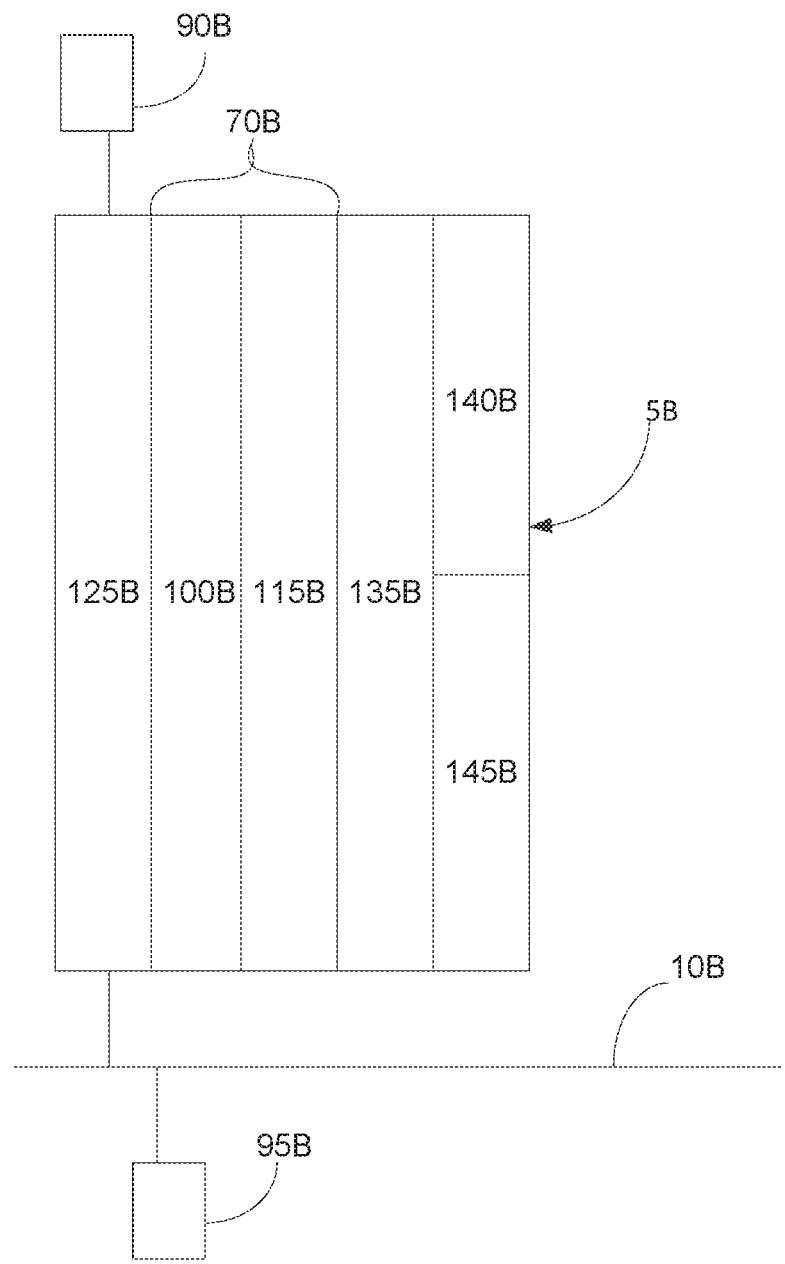
FIG. 6 is a schematic illustration of another exemplary signal generator, in accordance with embodiments herein.
Figure 7:
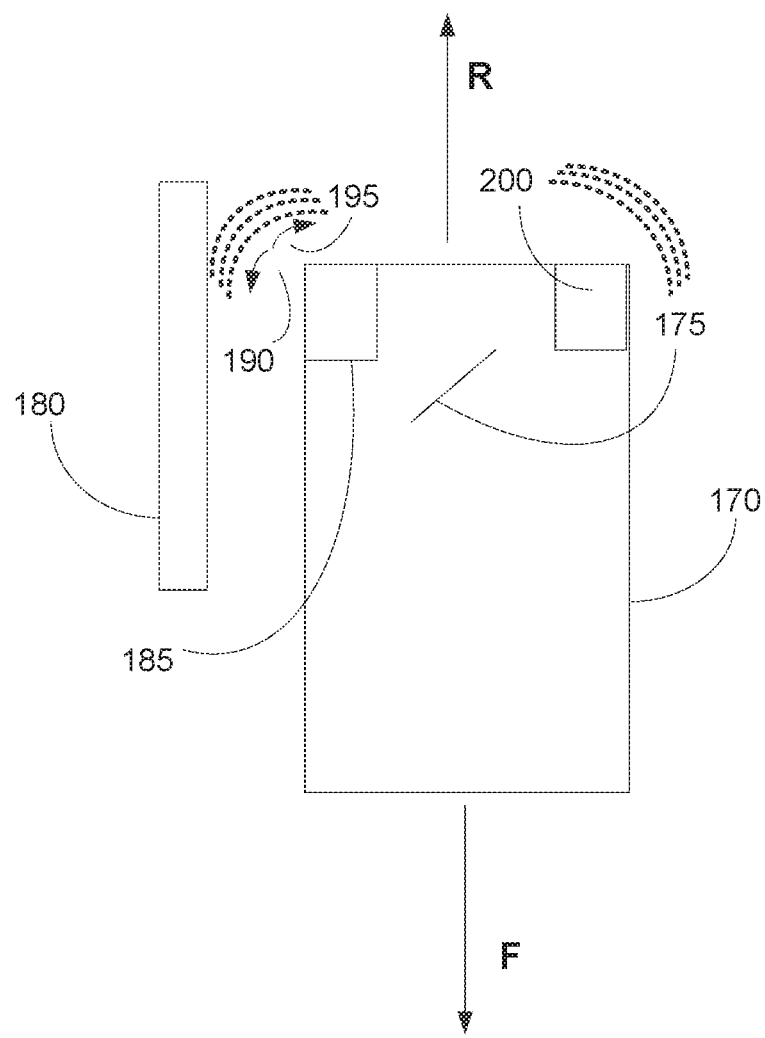
FIG. 7 is a schematic illustration of a forklift truck equipped with a signal module stopped next to a shelf unit.
Figure 8:
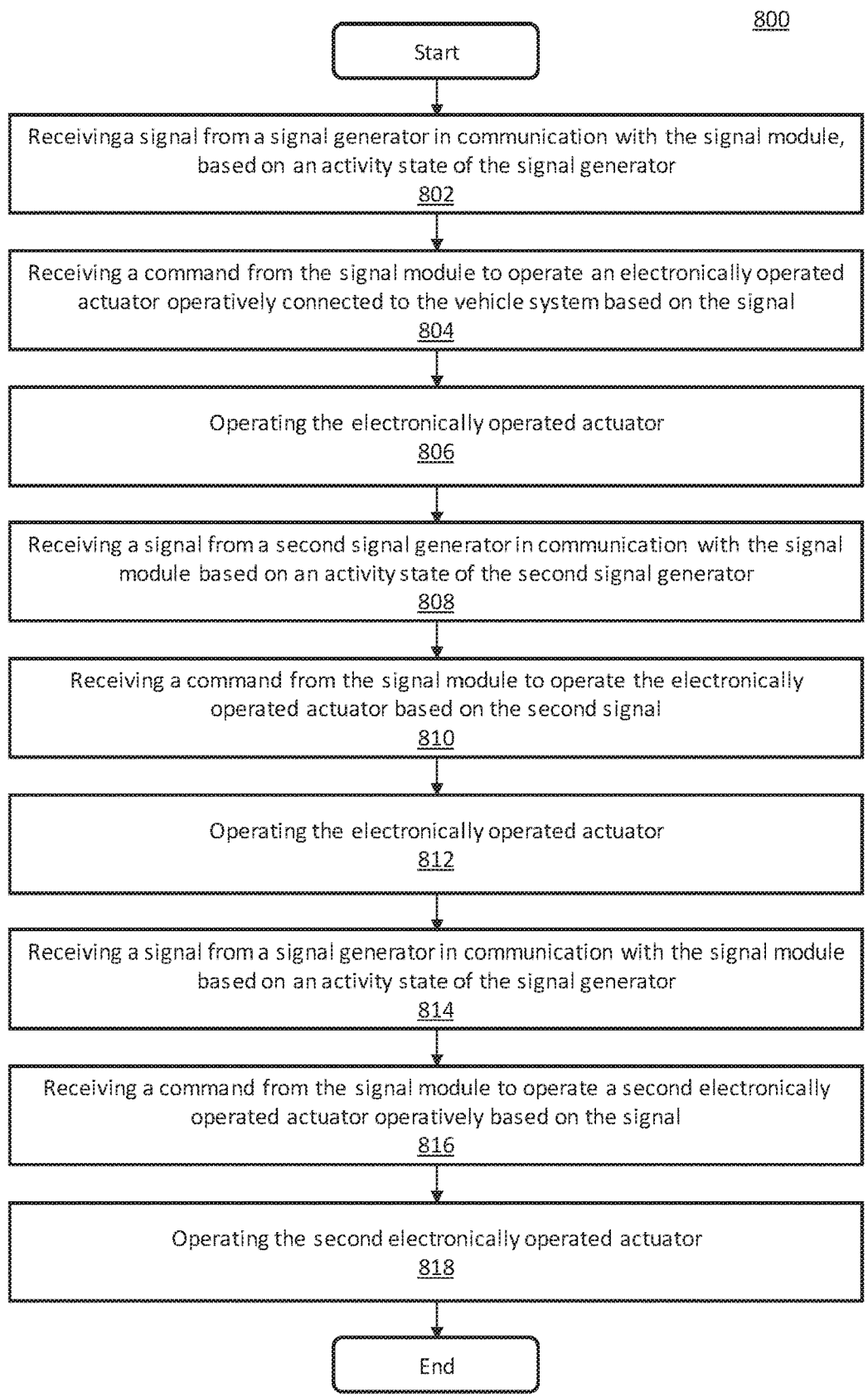
FIG. 8 is a flow chart illustrating a method of operating vehicle, in accordance with embodiments herein.

Turning to FIG. 8, which illustrates an exemplary method 800, which may be a computer implemented method, of operating a vehicle system with a vehicle control system as described herein with reference to the components shown and described in FIGS. 3A-7.

At block 802 the signal module 70, for example comprising one or more processors coupled to memory, receives a signal from a signal generator (e.g. signal generators 90, 95, or 150) in communication with the signal module 70. The signal generator (e.g. signal generator 90, 95, or 150) transmits the signal to the signal module 70 based on an activity state of the signal generator, for example an alert that the vehicle is traveling a certain speed or is proximity to an object.

At block 804, the vehicle controller (e.g. VSM 5 or VSM 5A), for example comprising one or more processors coupled to memory, receives a command from the signal module 70 to operate an electronically operated actuator (such as an actuator described herein) operatively connected to the vehicle system in a first manner based on (i) a first user option and (ii) the signal from the signal generator to cause the vehicle controller to operate the electronically operated actuator in a second manner based on (i) a second user option and (ii) the signal; thereby operating the vehicle system with the vehicle control system.

In block 806, the vehicle controller (e.g. VSM 5 or VSM 5A) operates the electronically operated actuator in response to the command from the signal module 70.

The methods described herein can be built out to handle multiple signals from multiple signal generators as well as multiple electronically operated actuators. For example, turning to block 808, optionally or additionally, the signal module 70 may receive a signal from a second signal generator (e.g. 90, 95, or 150) in communication with the signal module 70. The second signal generator transmits the signal to the signal module 70 based on an activity state of the second signal generator.

At block 810, the vehicle controller (e.g. VSM 5 or VSM 5A) receives a command from the signal module 70 to operate the electronically operated actuator in a third manner based on (i) a third user option and (ii) the second signal and to cause the vehicle controller to operate the electronically operated actuator in a fourth manner based on (i) a fourth user option and (ii) the second signal.

At block 812, the vehicle controller (e.g. VSM 5 or VSM 5A) operates the electronically operated actuator.

Turning to block 814, optionally or additionally, the signal module 70 may receive a signal from a signal generator in communication with the signal module 70. The signal generator transmits the signal to the signal module 70 based on an activity state of the signal generator.

At block 816 the vehicle controller (e.g. VSM 5 or VSM 5A) receives a command from the signal module 70 to operate a second electronically operated actuator operatively connected to a second vehicle system, in a fifth manner based on (i) the first user option, (ii) the signal, and (iii) the second signal and to cause the vehicle controller to operate the electronically operated actuator and the second electronically operated actuator in a sixth manner based on (i) the second user option, (ii) the signal, and (ii) the second signal.

At block 818, the vehicle controller (e.g. VSM 5 or VSM 5A) operates the second electronically operated actuator.

In certain embodiments, the second electronically operated actuator communicates with the vehicle controller (e.g. VSM 5 or VSM 5A) via the first communication system, for example CAN bus 10. In certain embodiments, the signal module 70 and the vehicle controller (e.g. VSM 5 or VSM 5A) operate on the same processor and the same memory. In certain embodiments, the signal module and the vehicle controller operate on a different processor and a different memory.

Programming and operation of a vehicle with the hypothetic functions described above for a first user is described with reference to FIG. 3A. Base software 115 of the controller 80 includes programming to determine whether an object is within a user-defined distance of the front of a vehicle based on a distance signal transmitted by signal source 90. The value for the user-defined distance from the front of the vehicle resides in configuration file 100, and is set to a value of 3 m. Base software 115 of the controller also includes programming to set a forward speed limit for the vehicle if an object is detected within the user-defined distance of the front of the vehicle. The value for the forward speed limit is contained in the configuration file 100, and is set to 5 km/h.

Base software 115 of the controller 80 includes programming to determine whether an object is within a user-defined distance of the rear of the vehicle based on a distance signal transmitted by signal source 95. The value for the user-defined distance from the rear of the vehicle resides in configuration file 100, and is set to a value of 5 m. Base software 115 of the controller 80 also includes programming to set a reverse speed limit for the vehicle if an object is detected within the user-defined distance of the rear of the vehicle. The value for the reverse speed limit is contained in the configuration file 100, and is set to 2 km/h.

Base software 115 of the controller 80 includes programming to determine whether the vehicle should be held at a stop state if the vehicle is stopped by the operator and user-defined conditions exist. Such programming determines that no hold should be applied if no object is detected, or an object is detected to be more than a user-defined distance in front of the vehicle, or if an object is detected to be more than a user-defined distance behind the vehicle based on signals transmitted from signal sources 90 and 95. The value for the user-defined distance in front of the vehicle for determining whether a hold should be applied is stored in the configuration file 100, and is set to be less than or equal to 3 m. The value for the user-defined distance behind the vehicle for determining whether a hold should be applied is stored in the configuration file 100 and is set to less than or equal to 5 m.

Base software 115 of the controller 80 includes programming to determine whether an override of a hold at a stop state is permitted. Such programming determines that an override is allowed if an object is within a user-defined distance range in front of the truck, or if an object is within a user-defined distance range behind the truck. The value for the distance range in front of the truck is contained in the configuration file 100, and is set to be less than or equal to 2 m to greater than or equal to 1 m. The value for the distance range behind the truck is contained in the configuration file 100, and is set to be less than or equal to 3 m to greater than or equal to 2 m. Such programming also determines that an override is not allowed if an object is a user-defined distance in front of the truck or closer, or if an object is a user-defined distance behind the truck or closer. The value for the user-defined distance in front of the truck is contained in the configuration file 100, and is set to be less than 1 m. The value for the user-defined distance behind the truck is contained in the configuration file 100, and is set to be less than 2 m.

In operation, the hypothetic vehicle functions such that setting a forward travel speed limit or a reverse travel speed limit may be modified by the signal module 70. For example, in response to receiving a distance signal from the signal source 90 indicating that an object is over 3 m from the front of the vehicle no forward travel speed limit is set by the signal module 70. However, in response to receiving a distance signal from the signal source 90 indicating that an object is 3 m or closer to the front of the vehicle, and receiving a signal from the signal source 205 indicating that the vehicle is traveling in a forward direction, the controller 80 of the signal module 70 transmits a signal containing instructions to set a forward speed limit to 5 km/h to the VSM 5A via the CAN bus 10. Optionally, the value for the user option, forward speed limit, is contained in the configuration file 100. In response to receiving such a control signal from the signal module 70, the VSM 5A limits the forward speed of the vehicle to a maximum of 5 km/h regardless of the pedal position indicated by a signal received from the accelerator position signal source 20. Optionally, the controller 80 may continuously transmit, or periodically transmit, such a control signal to the VSM 5A while an object is 3 m or closer to the front of the vehicle and the vehicle is traveling in a forward direction. Optionally, the VSM 5A may maintain a forward speed limit of 5 km/h until another control signal is transmitted from the signal module 70 to the VSM 5A indicating that no forward speed limit applies.

For example, in response to receiving a distance signal from the signal source 95 indicating that an object is over 5 m from the back of the vehicle no reverse travel speed limit is set by the signal module 70. However, in response to receiving a distance signal from the signal source 95 indicating that an object is 5 m or closer to the rear of the vehicle, and receiving a signal from the signal source 205 indicating that the vehicle is traveling in a reverse direction, the controller 80 of the signal module 70 transmits a signal containing instructions to set a reverse speed limit to 2 km/h to the VSM 5A via the CAN bus 10. Optionally, the value for the user option, reverse speed limit, is contained in the configuration file 100. In response to receiving such a control signal from the signal module 70, the VSM 5A limits the reverse speed of the vehicle to a maximum of 2 km/h regardless of the pedal position indicated by a signal received from the accelerator position signal source 20. Optionally, the controller 80 may continuously transmit, or periodically transmit, such a control signal to the VSM 5A while an object is 5 m or closer to the rear of the vehicle and the vehicle is traveling in a reverse direction. Optionally, the VSM 5A may maintain a reverse speed limit of 2 km/h until another control signal is transmitted from the signal module 70 to the VSM 5A indicating that no reverse speed limit applies.

Another vehicle function that may be modified by the signal module 70 is whether the vehicle maintains a hold on a stop state. If an operator brings a vehicle to a stop using brake pedal 17 (FIG. 4) and neither the signal source 90 nor the signal source 95 detect an object, the vehicle is allowed to move by the VSM 5A in response to releasing the brake pedal 17. However, if the operator brings the vehicle to a stop using brake pedal 17 and the signal source 90 detects an object, the vehicle may be held at a stop state. For example, after the vehicle is brought to a stop and in response to receiving a distance signal from the signal source 90 indicating that an object is 2 m or closer to the front of the vehicle and receiving a signal from the signal source 205 indicating that the vehicle is set to travel in a forward direction, the controller 80 of the signal module 70 transmits a control signal via the CAN bus 10 to the VSM 5A instructing the VSM 5A to maintain the vehicle at a stop state regardless of brake pedal position or accelerator pedal position. Optionally, the controller 80 may continuously transmit, or periodically transmit, such a control signal to the VSM 5A while an object is 2 m or closer to the front of the vehicle and the vehicle is set to travel in a forward direction. Optionally, the VSM 5A may maintain a hold on a stop state until another control signal is transmitted from the signal module 70 to the VSM 5A indicating that no hold applies.

Likewise, if the operator brings the vehicle to a stop using brake pedal 17 and the signal source 95 detects an object, the vehicle may be held at a stop state. For example, after the vehicle is brought to a stop and in response to receiving a distance signal from the signal source 95 indicating that an object is 3 m or closer to the rear of the vehicle and receiving a signal from the signal source 205 indicating that the vehicle is set to travel in a reverse direction, the controller 80 of the signal module 70 transmits a control signal via the CAN bus 10 to the VSM 5A instructing the VSM 5A to maintain the vehicle at a stop state regardless of brake pedal position or accelerator pedal position. Optionally, the controller 80 may continuously transmit, or periodically transmit, such a control signal to the VSM 5A while an object is 3 m or closer to the rear of the vehicle and the vehicle is set to travel in a reverse direction. Optionally, the VSM 5A may maintain a hold on a stop state until another control signal is transmitted from the signal module 70 to the VSM 5A indicating that no hold applies.

Another vehicle function that may be modified by the signal module 70 is whether an override of a hold on a stop state is allowed. For example, if the operator brings the vehicle to a stop using brake pedal 17 and the signal source 90 detects an object, the vehicle may be held at a stop state as described above. The operator may attempt to move the vehicle in a forward direction by pressing override button 120 which generates and sends an override signal to the signal module 70. Based on the distance signal from the signal source 90 and the override signal from the override button 120 the signal module 70 determines whether the hold on the stop state may be overridden. For example, if the distance signal from the signal source 90 indicates that an object is 1 m distant, or more, from the front of the truck a hold override may be allowed and the operator may move the truck in a forward direction. As described above, a forward speed limit may be applied by the signal module 70. However, if the distance signal from the signal source 90 indicates that an object is less than 1 m from the front of the truck a hold override may not be allowed and the operator may not move the truck in a forward direction. If the signal module 70 receives a travel direction signal from the signal source 205 indicating that the vehicle is set to travel in a reverse direction the operator may move the vehicle in the reverse direction away from the object detected by the signal source 90, optionally, with or without the controller 80 receiving the override signal.

Likewise, if the operator brings the vehicle to a stop using brake pedal 17 and the signal source 95 detects an object, the vehicle may be held at a stop state as described above. The operator may attempt to move the vehicle in a reverse direction by pressing override button 120 which generates and sends an override signal to the signal module 70. Based on the distance signal from the signal source 95 and the override signal from the override button 120, the signal module 70 determines whether the hold on the stop state may be overridden. For example, if the distance signal from the signal source 95 indicates that an object is 2 m, or more, distant from the rear of the truck a hold override may be allowed and the operator may move the truck in a reverse direction. As described above, a reverse speed limit may be applied by the signal module 70. However, if the distance signal from the signal source 95 indicates that an object is less than 2 m from the rear of the truck a hold override may not be allowed and the operator may not move the truck in a reverse direction. If the signal module 70 receives a travel direction signal from the signal source 205 indicating that the vehicle is set to travel in a forward direction the operator may move the vehicle in the forward direction away from the object detected by the signal source 95, optionally, with or without the controller 80 receiving the override signal.

Changing the values for the user options for the user-determined conditions and results that reside in the user option storage, such as the optional configuration file 100, alters the vehicle functions. For example, modifying the variable placeholders with new values for such variable placeholders may change one or more of the forward speed limit, the distance an object needs to be in front of the vehicle for the forward speed limit to apply, the reverse speed limit, the distance an object needs to be behind the vehicle for the reverse speed limit to apply, the distance of an object in front of or behind the vehicle for a hold to a stop state to apply, and the distances at which a hold to a stop state may be overridden. However, changing such variable placeholders may be done without modifying the base software 115 in the VSM 5A. Optionally, the VSM 5A may comprise hardware 125 for interacting with the CAN bus 10, configuration file 130, base software 135, a controller 140, and a memory 145. Instead of the variable placeholders residing in the optimal configuration file 100, such variable placeholders may reside in the user option storage which may comprise one or more of the configuration file 130 of the VSM 5A, the configuration file 100, and the base software 115 of the controller 80. With variable placeholders residing in one or more of the configuration file 130 of the VSM 5A, the configuration file 100, and the base software 115 of the controller 80 such variable placeholders may be changed without modifying the base software 135 of the VSM 5A. For example, if only the configuration file 130 is included in an embodiment, the configuration file 130 may retain variable placeholders for both base software 115 and for base software 135. Upon vehicle startup, variable values for base software 115 may be transmitted from the configuration file 130 to the controller 80, to be stored in the memory 110, for example, and variable values in the configuration file 130 may be accessed as needed by base software 135.

Adding and Removing Signal Sources

Including the signal module 70 also provides flexibility for adding and removing other signal sources.

Figure 9:
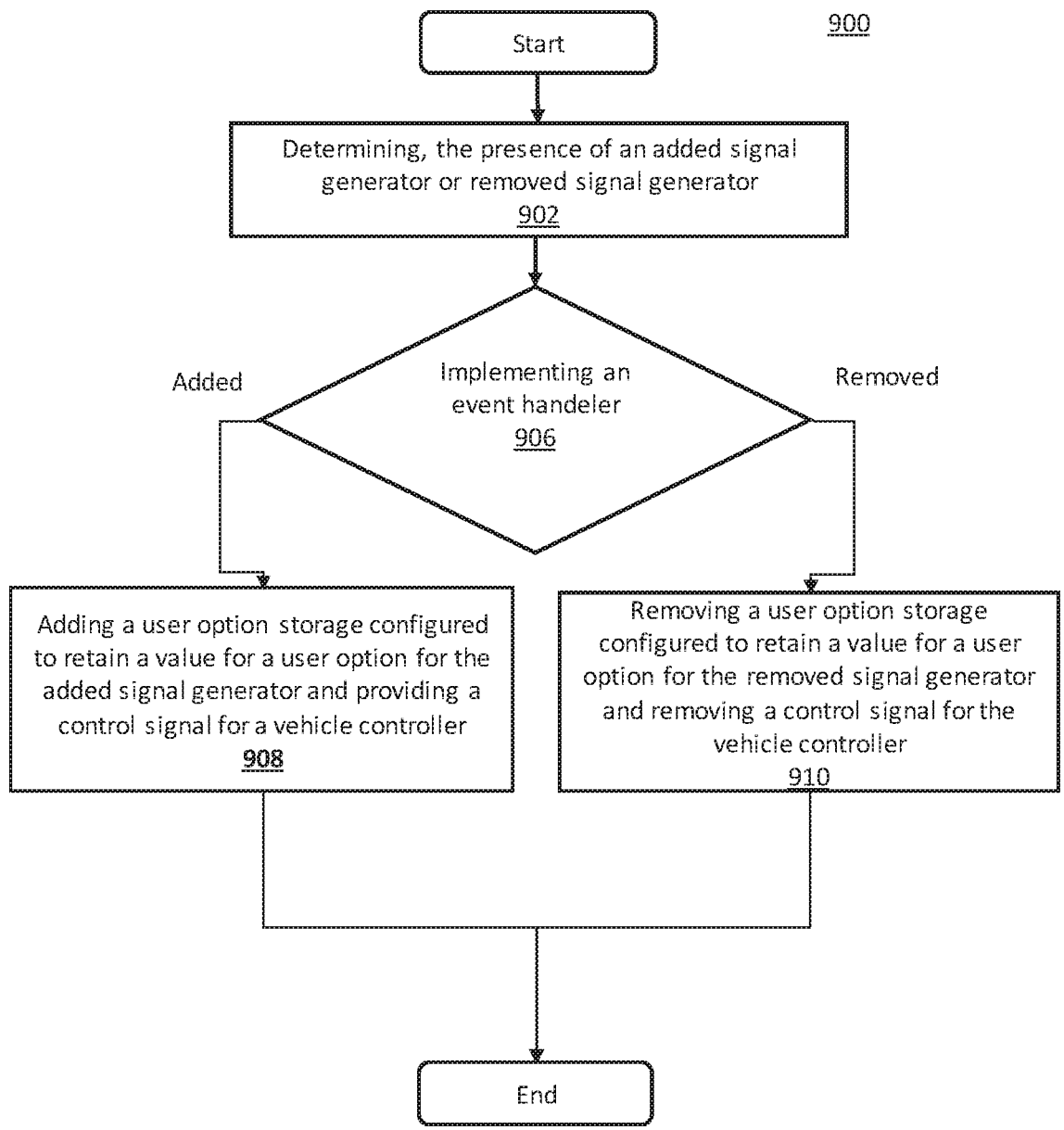
FIG. 9 is a flow chart illustrating a method of reconfiguring a vehicle control system in response to the addition of removal of a signal generator, in accordance with embodiments herein.

Turning to FIG. 9, which illustrates an exemplary method 900 of adding or removing one or more signal sources from a vehicle control system as described herein with reference to the components shown and described in FIGS. 3A-7.

In block 902 the signal control module 70 determines if a signal generator or source has been added or removed. For example, with reference to FIG. 3B, hypothetically, a proximity detector 150 is added by attaching the proximity detector 150 to the vehicle and placing the proximity detector 150 in communication with the CAN bus 75. Via the CAN bus 75, the proximity detector 150 communicates with the signal module 70. By including appropriate hardware, software or both, the signal module 70 communicates with signal sources regardless of whether such sources generate digital signals or analog signals.

In block 904 the signal control module 70 implements an event handler in response to the detection of an added signal generator or removed signal generator.

In block 908 signal control module 70 event handler adds a user option storage configured to retain a value for a user option for the added signal generator and provides a control signal for a vehicle controller (VSM 5 or 5A, for example) for the added signal generator if there is an added signal generator detected. In examples, determining the presence of an added signal generator, comprises detecting, with the signal module 70, a signal from the added signal generator indicating that the added signal generator was added to the vehicle control system.

In block 910 the signal control module 70 event handler removes a user option storage configured to retain a value for a user option for the removed signal generator and removes a control signal for the vehicle controller (VSM 5 or 5A, for example) for the removed signal generator if there is a removed signal generator detected. In examples determining the presence of removed signal generator, includes detecting, with the signal module 70, an absence of signal from the removed signal generator indicating that the removed signal generator was removed from the vehicle control system.

By programming the signal module 70 to receive signals from the proximity detector 150 and to generate control signals for the VSM 5A, the VSM 5A may effect changes to vehicle functions based on signals originating from the proximity detector 150 without modifying the base software 135 of the VSM 5A.

As a hypothetic example, the proximity detector 150 may be an RFID reader that generates a signal when placed within a pre-determined distance of an RFID source, such as a badge worn by a pedestrian. In response to receiving a signal from the proximity detector 150, the base software 115 of the controller 80 in the signal module 70 may be programmed to send control signals to the VSM 5A that instruct the VSM 5A to limit the speed of the vehicle to 1 km/h. In turn, the VSM 5A may actuate one or more of the brake actuator 45, throttle actuator 50, and transmission shift actuator 155 to limit the speed of the vehicle to 1 km/h based on the signals generated by the proximity detector 150 and, in turn, the controller 80. And, the VSM 5A may use signals from the wheel speed sensor 35 to determine when the speed of the vehicle reaches 1 km/h.

Hypothetically, another user may desire a different vehicle response, and a variable placeholder in the configuration file 100, the configuration file 130, or the base software 115 of the controller 80 may be changed such that when the signal module 70 receives a distance signal from the distance sensor 90 while also receiving a signal from the proximity detector 150 the controller 80 sends a control signal to the VSM 5A to stop the vehicle. For example, the vehicle may be brought to a stop when the distance signal indicates that an object is 2 m in front of the vehicle and a signal is received from the proximity detector 150.

In other embodiments, a different signal module may be used instead of signal module 70. For example and with reference to FIG. 5, signal module 70A could be swapped for signal module 70 of FIG. 3B. Signal module 70A is similar to signal module 70, and comprises hardware 85A, and, as part of the controller 80A, configuration file 100A, base software 115A, processor 105A and memory 110A. Hardware 85A comprises a signal receiving portion for receiving signals from signal sources and a signal transmitting portion for transmitting signals to a VSM. As with signal module 70, the configuration file 100A is optional for signal module 70A. Instead of communicating with controller 80A via a communication system, signal sources 90A and 95A communicate directly with controller 80A. Such direct communication may be via wires, a wireless system, or other suitable manner for directly transmitting a signal to the controller 80A without such signal traversing a system that carries signals from multiple signal sources. As another example and with reference to FIG. 6, a signal module could be included in the VSM. As illustrated in FIG. 6 VSM 5B comprises hardware 125B, signal module 70B, base software 135B, processor 140B, and memory 145B. Signal module 70B comprises an optional configuration file 100B and base software 115B. Modifications for vehicle functions may be made by modifying variable placeholders in configuration file 100B, if included, by modifying the base software 115B, or both. While base software 115B and base software 135B both reside in VSM 5B, they are separate software programs such that modifications to the base software 115B do not alter the base software 135B in any manner other than providing different inputs into the base software 135B. Base software 115B of the signal module 70B may be an app, software module, routine, or other suitable software portion, that resides on the hardware of the VSM 5B, but is separate from the base software 135B of the VSM 5B. Optionally, signal sources may communicate directly with the signal module 70B by directly communicating with the VSM 5B as illustrated for signal source 90B. Optionally, signal sources may communicate with the signal module 70B via a communication system 10B that communicates with the VSM 5B as illustrated for signal source 95B. Base software 115B comprises programming that interfaces with hardware 125B to serve as a signal receiving portion for receiving signals from signal sources and programming that transmits signals from base software 115B to base software 135B to serve as a signal transmitting portion for transmitting signals to a VSM.

The foregoing is a detailed description of illustrative embodiments of the invention using specific terms and expressions. Various modifications and additions can be made without departing from the spirit and scope thereof. For example, a modification is to include actuators, such as actuator 160 (FIG. 3C), directly or indirectly communicating with a signal module, for example, to be connected to CAN bus 10. For example, actuator 160 may provide haptic feedback through steering wheel 165 (FIG. 4) by causing steering wheel 165 to vibrate when the controller receives a distance signal from sensor 95 and in turn generates and sends a control signal to the actuator 165 as well as a control signal to the VSM 5A, for example, to set a reverse speed limit as described above. Thus, a signal module may send one or more control signals to actuators, other controllers, or a combination of actuators and other controllers, based on receiving one or more signals.

Any suitable sensor, detector, button or other suitable signal generator may communicate with a sensor module, or may communicate with a vehicle controller that receives control signals from a sensor module with instructions regarding how the vehicle controller should react to signals from the signal source. Sensors, detectors, and other suitable signal generators may obtain information relating to distances, operational environment, and other suitable information from any direction with respect to a vehicle, or may obtain information concerning any system, component, operational state, or other suitable aspect of a vehicle.

For example, a forklift truck 170 has a rear steerable wheel 175 positioned as illustrated in FIG. 7. A steering angle sensor, such as steering angle sensor 30, sends a steering angle signal to a signal module, such as signal module 70. Forklift truck 170 is stopped next to a shelf unit 180, which is detected by a sensor 185. Sensor 185 also determines the distance between the forklift truck 170 and the shelf unit 180 and sends a signal to a signal module, such as one described above. A forward/reverse signal sensor, such as direction sensor 205, also sends a signal to the signal module.

Based on the distance to the shelf unit 180, whether the forklift truck 170 is set for forward movement or reverse movement, and the steering angle, the signal module generates and sends a control signal to the VSM of the forklift truck 170 indicating whether to allow forklift truck 170 to move, or whether to maintain forklift truck 170 at a stop state. For example, if the forklift truck is set to move in a forward direction "F" the signal module may be programmed to recognize that the rear of the forklift truck 170 will move along arrow 190 and collide with the shelf unit 180 if forklift truck is permitted to move. Thus, the signal module may generate and transmit a control signal to the VSM instructing the VSM to maintain the forklift truck 170 at a stop state. If the forklift truck is set to move in a reverse direction "R" the signal module may be programmed to recognize that the rear of the forklift truck 170 will move along arrow 195 and not collide with the shelf unit 180 if forklift truck is permitted to move.

The signal module may also be programmed to receive a distance signal from sensor 200. The signal from sensor 200 may indicate that there is no object behind, or behind and to the left of the forklift truck 170 as illustrated in FIG. 7. Or, sensor 200 may indicate that an object is present and provide the distance to such object. Based on a signal from sensor 200, the steering angle, and movement direction, the signal module may be programmed to determine whether such object is beyond a sweep area of the frame of the forklift truck 170. If there is no object, or the signal module determines that an object is beyond the sweep area of the frame of the forklift truck 170, the signal module may generate and transmit a control signal to the VSM instructing the VSM to allow the forklift truck 170 to move.

The above examples are provided for illustration purposes. One skilled in the art will recognize that multiple sensors, sensors with integrated sensing capabilities, such as multiple directions, and other suitable sensor arrangements may be configured to communicate with a sensor module and the sensor module may be programmed to provide a variety of command signals to a VSM. Such arrangements may provide user flexibility for customizing vehicle functions, such as operating conditions and parameters without reprogramming a vehicle's VSM.

Therefore, the invention is not limited by the above terms and expressions, and the invention is not limited to the exact construction and operation shown and described. On the contrary, many variations and embodiments are possible and fall within the scope of the invention which is defined only by the claims that follow.

The invention claimed is:

1. A vehicle control system comprising:
   an actuator operatively connected to a vehicle system for altering a function of the vehicle system;
   a vehicle controller operatively connected to the actuator, wherein the vehicle controller is configured to receive a first control signal of a first type or a second control signal of the first type to alter the function of the vehicle system, and comprises one or more processors programmed to operate the actuator according to the first control signal or the second control signal; and
   a signal module, comprising:
      a signal receiving portion configured to receive a signal of a second type from a first signal generator;
      a first user option storage configured to retain a first value for a first user option for the first signal generator;
      one or more processors configured to:
         generate the control signal for the vehicle controller based at least in part on the signal received from the first signal generator and the first value for the first user option, the control signal to cause alteration of the function of the vehicle system in a first manner; and
         generate the second control signal for the vehicle controller to alter the function of the vehicle system in a second manner based on (i) a second value for a second user option and (ii) a second signal received from a second signal generator; and
      a signal transmitting portion coupled to the one or more processors, the signal transmitting portion configured to transmit the control signal to the vehicle controller.

2. The vehicle control system according to claim 1, wherein the one or more processors comprise a first processor and a first memory and wherein the vehicle controller and the signal module both use the first processor and the first memory.

3. The vehicle control system according to claim 1, wherein the one or more processors comprise a first processor coupled to a first memory and a second processor coupled to a second memory and wherein the vehicle controller uses the first processor and the first memory and wherein the signal module uses the second processor and the second memory.

4. The vehicle control system according to claim 1, wherein:
   the vehicle control system further comprises a first communication system and the signal module further comprises a second communication system; and
   wherein the signal transmitting portion communicates with the vehicle controller via the first communication system and the signal receiving portion communicates with the first signal generator via the second communication system.

5. The vehicle control system according to claim 1, wherein the vehicle system function is a forward speed limit.

6. The vehicle control system according to claim 5, wherein the signal received from the first signal generator contains information relating to a distance of an object in front of a vehicle.

7. The vehicle control system according to claim 1, wherein the vehicle function is a reverse speed limit.

8. The vehicle control system according to claim 7, wherein the signal received from the first signal generator contains information relating to a distance of an object behind a vehicle.

9. The vehicle control system according to claim 1, wherein the vehicle function is a hold on a stop state.

10. The vehicle control system of claim 1, further comprising a vehicle, and wherein the vehicle system is part of and affects an operational characteristic of the vehicle.

11. The vehicle control system according to claim 1, further comprising:
   a second vehicle system;
   a value for a second user option retained in the user option storage; and
   a second actuator operatively connected to the second vehicle system for altering a function of the second vehicle system, wherein the vehicle controller is operatively connected to the second actuator to operate the second actuator according to the second control signal of the first type;
   wherein the signal module is configured to generate the second control signal to cause the vehicle controller to operate the second actuator based at least in part on the signal received from the signal generator, and the value of the second user option.

12. A method of operating a vehicle system with a vehicle control system, comprising:
   receiving, with a signal module, a first signal of a first type from a signal generator, where the first signal is based on an activity state of the signal generator;
   reading, by the signal module, from a configuration file a first user option corresponding to the signal generator;

generating, with the signal module, a first command of a second type to a vehicle controller to operate an actuator operatively connected to the vehicle system, the first command based at least in part on the first user option and the first signal of the first type;

transmitting, by the signal module, the first command to the vehicle controller;

operating, with the vehicle controller, the actuator based on the first command;

receiving, with the signal module, a second signal of a third type from a second signal generator, where the second signal of the third type is based on an activity state of the second signal generator;

reading, by the signal module, from the configuration file a second user option corresponding to the second signal generator;

generating, with the signal module, a second command of the second type to the vehicle controller to operate the actuator, the second command based at least in part on the second user option and the second signal of the third type;

transmitting, by the signal module, the second command to the vehicle controller; and operating, with the vehicle controller, the actuator based on the second command.

13. The method according to claim 12, wherein the vehicle controller, the actuator, and the signal module are in communication on a first communication system, and wherein the signal generator and the signal module are in communication on a second communication system.

14. The method according to claim 13, wherein the actuator is a first actuator, and further comprising:

generating, with the signal module, a third command of the second type to the vehicle controller to operate a second actuator operatively connected to a second vehicle system, the third command based at least in part on the first user option, the first signal of the first type, and the second signal of the third type;

transmitting, by the signal module, the third command to the vehicle controller; and operating, with the vehicle controller, the second actuator based on the third command.

15. The method according to claim 14, wherein the second actuator communicates with the vehicle controller via the first communication system.

* * * * *

UNITED STATES PATENT AND TRADEMARK OFFICE
CERTIFICATE OF CORRECTION

PATENT NO. : 11,332,137 B2  
APPLICATION NO. : 16/500077  
DATED : May 17, 2022  
INVENTOR(S) : Cheyne et al.

Page 1 of 1

It is certified that error appears in the above-identified patent and that said Letters Patent is hereby corrected as shown below:

On the Title Page

In the illustrative figure, Ref. Numeral 802, Line 1, delete "Receivinga" and insert --Receiving a--.

In the Drawings

Sheet 10 of 11, in Fig. 8, for Tag 802, Line 1, delete "Receivinga" and insert --Receiving a-- therefor.

Sheet 11 of 11, in Fig. 9, for Tag 906, Line 2, delete "event handeler" and insert --event handler-- therefor.

In the Specification

In Column 2, Line 2, delete "addition of" and insert --addition or-- therefor.

Signed and Sealed this  
Twenty-fourth Day of September, 2024

Katherine Kelly Vidal  
*Director of the United States Patent and Trademark Office*